United States Patent [19]

Yogev et al.

[11] Patent Number: 4,461,276
[45] Date of Patent: Jul. 24, 1984

[54] AQUEOUS GEL FOR HEAT STORAGE POND AND METHOD FOR MAKING THE GEL

[75] Inventors: Amnon Yogev, Rehovoth; David Mahlab, Ramat Gan, both of Israel

[73] Assignee: Ormat Turbines Ltd., Yavne, Israel

[21] Appl. No.: 316,137

[22] Filed: Oct. 29, 1981

Related U.S. Application Data

[62] Division of Ser. No. 042,452, May 25, 1979, abandoned.

[51] Int. Cl.³ .............................................. F03G 7/02
[52] U.S. Cl. ..................................... 126/415; 126/400
[58] Field of Search ................................. 126/415, 400

[56] References Cited

U.S. PATENT DOCUMENTS 4,091,800 5/1978 Fletcher et al. ................... 126/415

OTHER PUBLICATIONS

British Provisional Patent Specification No. 19401/77, filed May 9, 1977.

Primary Examiner—Paul R. Michl
Attorney, Agent, or Firm—Sandler & Greenblum

[57] ABSTRACT

A gel is formed by copolymerizing an acrylic monofunctional monomer and an acrylic bifunctional monomer in an aqueous solution exposed to an oxygen containing atmosphere. Spontaneous polymerization takes place in an atmosphere containing oxygen after the solution is placed in sunlight, or in the dark if the solution also contains a dissolved inorganic salt. The gel so formed is transparent to solar radiation, and is stable in the presence of such radiation and of temperatures in the vicinity of the boiling point of water. As a consequence, the gel is suitable for covering a heat storage liquid and thermally insulates the liquid against significant conductive heat loss to an ambient medium above the gel. By providing a myriad of small bubbles trapped in the gel, the insulating efficiency of the gel is increased without significantly interferring with the transmission of solar radiation to the heat storage layer below the gel. A gel having such bubbles is produced by including constituents in the solution from which the gel is formed which produce a gas (i.e., $CO_2$).

37 Claims, 5 Drawing Figures

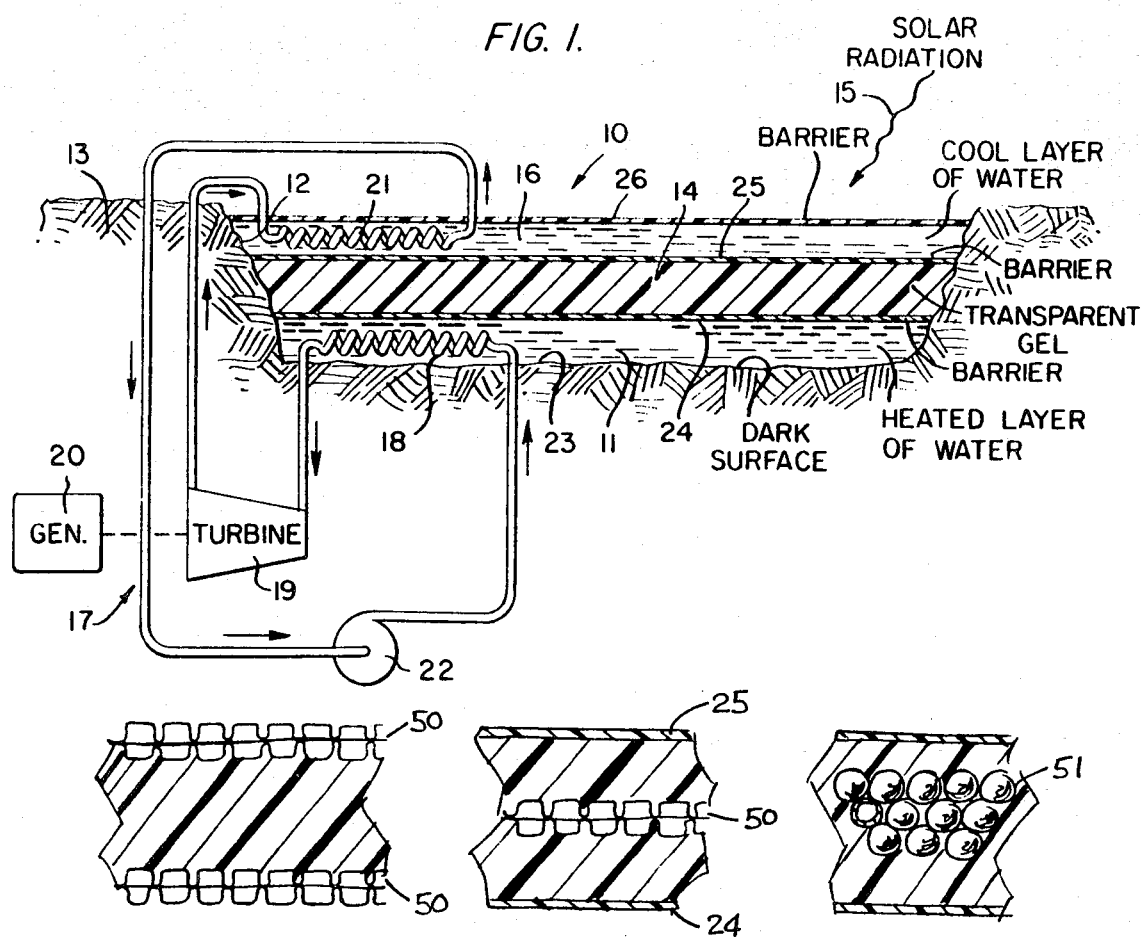
FIG. 1.
FIG. 3A. FIG. 3B. FIG. 3C.
FIG. 2.
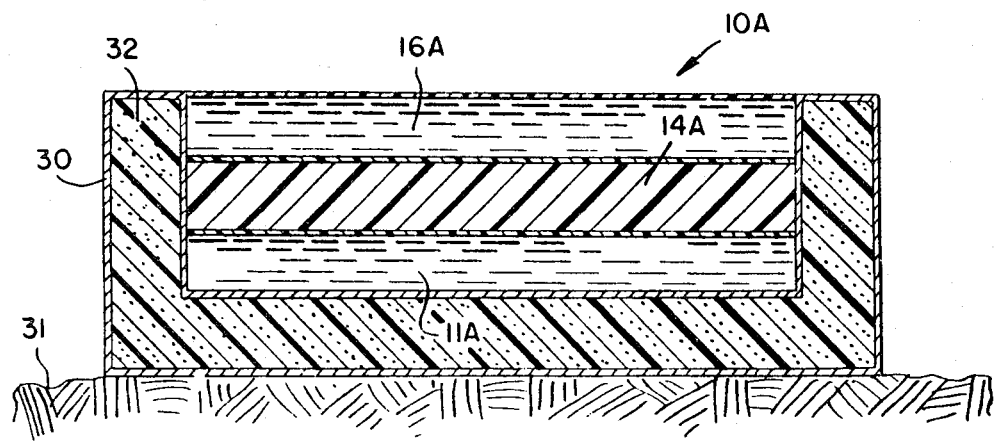

AQUEOUS GEL FOR HEAT STORAGE POND AND METHOD FOR MAKING THE GEL

This is a division of application Ser. No. 042,452 filed May 25, 1979, abandoned.

BACKGROUND OF THE INVENTION

This invention relates to heat storage ponds such as solar collectors, and to methods of and means for creating such ponds.

U.S. Pat. No. 4,091,800 discloses construction of a solar collector on the order of several acres in size. Such construction involves lining a large number of shallow trenches about 1-2 feet deep with a water impermeable plastic sheet, adding water to a depth of about one foot to the trenches, and floating a transparent plastic sheet on the surface of the water. The remaining height of each of the trenches is filled with clear water or with a transparent solid such as a gelatinous mass. The lower level of water is heated by its absorption of solar radiation that penetrates the gelatinous mass which serves to prevent heat loss from the water to the ambient medium above the gelatinous mass. There is no disclosure in this patent, however, of the nature of the gel, of a procedure for producing it on the scale contemplated, or of the constituents that will produce a gel that will be transparent to and stable in the presence of solar radiation.

British Provisional patent specification No. 1/9401/77 filed May 9, 1977 discloses a solar collector in which an aqueous gel of cross-linked polyacrylamide floats on a layer of water. The gel is transparent to solar radiation allowing the lower layer of water to be heated to a temperature approaching the boiling point.

The in situ production of an aqueous gel to cover a large-scale solar pond is a formidable task when starting with the monomeric constituents of the gel. The basic problem appears to be the inhibiting effect of atmospheric oxygen on the polymerization process by which the gel structure is formed after the monomeric constituents have been poured out on top of the heat collecting layer of the pond. The adverse effects of the atmospheric oxygen on the polymerization process is conventionally prevented in small-scale laboratory production by carrying out the polymerization process under an inert atmosphere such as a blanket of argon, nitrogen, $CO_2$, etc. which excludes atmospheric oxygen during the polymerization process. For obvious reasons, the above described laboratory expedient is impractical when constructing a large-scale solar pond under field conditions. It is therefore, an object of the present invention to provide a new and approved gel, as well as a new and approved method for preparing it under field conditions in the presence of atmospheric oxygen.

BRIEF SUMMARY OF THE INVENTION

In accordance with the present invention, the gel comprises a polymeric cross-linked network formed by co-polymerizing an acrylic monofunctional monomer and an acrylic bifunctional monomer in an aqueous solution in the presence of an atmosphere of oxygen. Preferably, the monofunctional monomer is acrylamide and the bifunctional monomer is methylene-bisacrylamide. Ammonium persulfate may be used as a catalyst, and N,N,N,N tetramethyl-ethylene diamine may be used as an activator.

The invention is practiced under field conditions by floating a transparent, water impervious film upon a heat storage liquid, preparing a gel by dissolving the monomius constituents and optional catalyst and activator in water and depositing the solution on the film. Spontaneous polymerization takes place in an atmosphere containing oxygen after the solution is placed in sunlight or in the dark if the aqueous solution from which the gel is formed contains a dissolved inorganic salt such as magnesium chloride. The gel so formed is transparent to solar radiation; and the presence of the salt also increases the mechanical strength of the gel and its resistance to drying out.

The gel may also include bubbles of such size and distribution as to increase the heat insulating quality of the gel without interferring with its ability to transmit solar radiation. In one form of this aspect of the invention, the bubbles are formed by gas generated during formation of the gel. In another embodiment, the bubbles are constituted by encapsulations imbedded in the gel.

BRIEF DESCRIPTION OF THE DRAWINGS

Embodiments of the invention are described below by way of example and with reference to the accompanying drawings we are enclosing:

FIG. 1 is a cross section of solar collector according to the present invention installed in a trench, and a power plant utilizing the same;

FIG. 2 is a cross section of a free-standing solar collector according to the present invention; and FIGS. 3A–C is a cross section of the gel according to the present invention utilizing the bubbles in the gel for increasing its heat insulation qualities.

DESCRIPTION OF THE PREFERRED EMBODIMENTS

Referring now to the drawing, FIGS. 1 and 2 are described in detail in U.S. patent application Ser. No. 899,815 filed Apr. 25, 1978, the disclosure of which is hereby incorporated by reference. FIG. 1 shows in schematic form a large scale solar pond whose order of magnitude is in the hectare (10,000 $m^2$) range to utilize the relatively low level energy available from the sun that occurs during daylight hours for heating a large quantity of water to temperatures that approach the boiling point. Layer 14, which is an aqueous gel, must be transparent to solar radiation and stable in the presence of such radiation as well as stable in the presence of heat of the order of magnitude of the boiling point of water. The above identified U.S. patent application describes an aqueous gel meeting these criteria, namely cross-linked polyacrylamide.

The thickness of layer 14 depends on the amount of heat loss that can be tolerated due to conduction through the gel from the relatively hot water beneath the gel to the relatively cool medium (ambient atmosphere) above the gel, particularly during non-daylight hours. If the gel has a thickness of about 50 centermeters, a hectare pond will require about 5,000 cubic meters of gel. The quantity of active ingredients necessary to make such a gel should obviously be minimized in order to reduce the cost of producing the gel as well as to reduce logistic problems in transporting the active ingredients to the location of the pond, particularly if the pond is remotely located. For this reason, the lower limits on the constituents of the gel are considered to be the primary importance together with the ease with which the gel can be created in situ.

From actual experience, it has been found that a suitable aqueous gel includes a polymeric cross-linked network formed by co-polymerization of an acrylic monofunctional monomer and an acrylic bifunctional monomer in a aqueous solution. A suitable monofunctional monomer is acrylamide; and suitable bifunctional monomers are methylene-bisacrylamide or 1, 2-ethylene-bisacrylamide. It is convenient, although not absolutely necessary, with these constituents to utilize a so called redox initiating system of catalyst and activator. Typically, a water soluble radical forming catalyst, such as ammonium persulfate(APS) is used in conjunction with an amine activator, e.g., tetramethylene diamine (TEMED). The preferred type of methylene-bisacrylamide is NN methylene-bisacrylamide; and the preferred form of tetramethylene-diamine is N,N,N,N tetramethylene-diamine. Other types may also be used sucessfully, however.

The preferred constituents of the gel are acrylamide (constituent A), methylene-bisacrylamide or 1,2-ethylene-bisacrylamide (constituent BIS), and amine activator (constituent TEMED) and a water soluble radical forming catalyst (constituent APS). A mixture of a% of A by weight of solution, and b% of BIS by weight of A is termed an a:b gel.

A 2:3 mixture spontaneously gells within about 2–3 hours in the presence of sunlight in an oxygen containing atmosphere at an ambient temperature of 20°–30° C. producing a clear gel that is transparent to solar radiation. This ratio is therefore preferred, although less preferred ratios may also be used. When kept in the dark, a 2:3 mixture does not completely gell even after an extended period of time; and in some cases, only about 60% of the mixture gells, the balance remaining water.

In a most preferred embodiment of the invention, the mixture contains at least about 2% of acrylamide by weight of the mixture so as to ensure complete spontaneous gelling when exposed to sunlight in an oxygen containing atmosphere. Although 2% is a preferred amount of acrylamide, lesser amounts, although yielding less reliable results, may also be used. Thus in a less preferred embodiment, amounts between about 1.5% and 2%, or even less acrylamide can be used. The amount of bis-acrylamide such as methlyene-bisacrylamide used may be as low as about 1% to as much as 10% based upon the weight of acrylamide. In a preferred embodiment, the amount used is about 3% by weight of acrylamide.

It has also been found that the presence of an inorganic salt in the mixture will enhance polymerization, and produce a more transparent and physically stronger gel. The transparency of a gel can be determined by projecting a laser beam through the gel, and measuring the amount of light transmitted. The ratio of incident to transmitted light will be a measure of the efficiency of transmission of the gel. In actual tests, the presence of hydrated magnesium chloride in practically any quantity will permit the mix to gel in the dark and will produce a gel more transparent to solar radiation and more durable in a mechanical sense. The advantages of using an inorganic salt are twofold: a superior gel is produced; and seawater or brackish water rather than fresh water can be used.

Experiments were carried out using $MgCl_2 \cdot 6H_2O$, laboratory grade $MgCl_2$ and Carnalite ($KMgCl_3 \cdot 6H_2O$) as well as mixtures of magnesium chloride, sodium chloride, calcium chloride and potassium chloride. Various quantities of these inorganic salts were used up to a concentration of about 20% by weight; and they all produced clear, transparent gels that polymerized without sunlight. The use of "Dead Sea end brine" produced by the Potash Company of Beersheba, Israel in 2:3 mixtures produced spontaneous polymerization in the dark but produced a yellow but transparent gel. The yellow color is apparently due to the bromines in the "end brine", but it was found that gels so produced lose their yellow color after being in the sun for a relatively short time.

It is believed that the addition of an inorganic salt enhances spontaneous polymerization because the salt displaces atmospheric oxygen during the gelling process.

In a further effort to eliminate atmospheric oxygen, experiments were carried out in which carbon dioxide was generated in the mixture. The presence of sodium bicarbonate and hydrochloric acid in a 2:3 mixture produces spontaneous polymerization in the sun and produced a very transparent gel that contained a small number of very small bubbles (i.e., about 5 bubbles per liter of about 1 mm diameter). By increasing the amount of sodium bicarbonate the density of bubbles is also increased to the point where they appear to be tangent to each other and completely fill the gel. By changing the amount of APS, TEMED, sodium bicarbonate and hydrochloric acid, the number and sizes of the bubbles can be changed.

The presence of such a large density of bubbles gives the gel a cloudy appearance but actual tests for transmission using a laser indicate a reduction of less than 10% in light transmission. Therefore, a gel with a high density of small diameter bubbles will form an insulator of greater efficiency allowing either a thinner gel layer to be used for achieving the same degree of insulation as a thicker non-bubble gel, or for the same thickness of gel to reduce conductive losses.

In addition to the chemical generation of gases during polymerization, bubbles may be introduced into the gel in other ways. For example, they can be mechanically injected, or gas can be bubbled through the gel during polymerization. In such case, nitrogen is a preferred gas rather than carbon dioxide because the latter is soluble in water. Finally, encapsulated bubbles can be embedded in the gel during its formation. Conventional "Blister-Pak" can be used on the top and bottom of the gel as barriers therefor, or embedded in the gel as shown in FIGS. 3A–B at 50. Alternatively, a plurality of transparent plastic balls 51 can be cast in place in the gel. In each case, the trapped bubbles enhance the insulating effect of the gel.

The method of preparing an aqueous gel from the acrylic monomers is exemplified by the following examples which are not considered as limiting:

EXAMPLE No. 1

Mixtures of 2:3 composition were prepared using 20 g of acrylamide, 0.6 g methylene-bisacrylamide, 0.625 g of APS in enough water to make 1 liter. Stirred into the solution is 0.063 ml of TEMED, all the constituents being at ambient temperature 20°–30° C. Each mixture gelled in about 2–3 hours when exposed to sunlight. If kept in the dark, about 60% of the mixture gelled, and the balance remained as water.

EXAMPLE NO. 2

A mixture like that of Example No. 1 was prepared, but 200 g MgCl$_2$.6H$_2$O were dissolved before the TEMED was added. After two hours at 22° C., the solution gelled in the dark to a clear firm gel.

EXAMPLE NO. 3

A mixture like that of Example No. 1 was prepared, but 5 g magnesium chloride.6H$_2$O was dissolved before the TEMED was added. The solution gelled at a temperature of 27° C. but an ungelled layer of 2 millimeters remained on top of the clear and firm gel.

EXAMPLE NO. 4

A mixture like that of Example No. 1 was prepared, but 200 g Carnalite (KMgCl$_3$.6H$_2$O) was dissolved before the TEMED was added. The solution gelled in the dark in two hours at an ambient temperature of 25° C.

EXAMPLE NO. 5

A mixture like that of Example No. 1 was prepared, but 300 g "Dead Sea end brine" were added before the TEMED was added. The solution gelled in the dark in 2.5 hours to a firm and transparent gel that was yellow in color.

EXAMPLE NO. 6

A 2:3 mixture was prepared using 20 g of A, 0.6 g BIS, 10 mg APS and 0.006 ml TEMED in enough water to make 1 liter. To this was added 350 cc of saturated solution of sodium bicarbonate and 70 cc of 32% concentration hydrochloric acid solution. The mixture was placed in the dark over night and the next day placed in the sun where it gelled producing a very transparent gel containing about 5 bubbles of about 1 mm diameter in the liter. The bubbles slowly collapsed after about three weeks so that after about three weeks the bubbles were approximately ½ the original size.

EXAMPLE NO. 7

A mixture like that of Example No. 6 was prepared except that the amount of sodium bicarbonate was doubled and 80 cc of 32% concentration hydrochloric acid was used. The gel produced was full of bubbles, tangent to each other, each about 2 mm in diameter.

In view of the experience using sodium bicarbonate, it is preferred to use 2:3 mixture, and it is believed that satisfactory results with bubble size and distribution result when the following constituents are added to each liter of water:

APS in the range 1 mg to 700 mg;
TEMED in the range 0 to 0.06 cc.
NaHCO$_3$ (saturated solution) in the range 100 cc to 700 cc.
HCl (32% solution) in the range 10 cc to 100 cc.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

We claim:

1. A method for the insitu production of an aqueous gel on top of a body of water constituting a heat storage liquid, the gel being transparent to solar radiation which penetrates the gel and is absorbed in the body of water, thereby constituting the latter as a solar pond, the method comprising the steps of:
    (a) applying a film barrier, transparent to solar radiation and impervious to water, on top of the heat storage liquid;
    (b) depositing on the barrier an aqueous solution of co-polymerizable monomers which, upon co-polymerization in aqueous solution, form said gel and an inorganic salt, wherein the aqueous solution of co-polymerizable monomers comprises an acrylic monofunctional monomer and an acrylic bifunctional monomer; and
    (c) co-polymerizing the solution in-situ while it is exposed to an oxygen-containing atmosphere so as to establish on said film barrier a gelled insulator which reduces conductive heat loss from the heat storage liquid to an ambient medium above said insulator.

2. A method for the insitu production of an aqueous gel on top of a body of water constituting a heat storage liquid, the gel being transparent to and stable in the presence of solar radiation which penetrates the gel and is absorbed in the body of water, thereby constituting the latter as a solar pond, the method comprising the steps of:
    (a) applying a film barrier, transparent to solar radiation and impervious to water, on top of the heat storage liquid;
    (b) depositing on the barrier an aqueous solution of co-polymerizable monomers which, upon co-polymerization in aqueous solution, form said gel and an inorganic salt; and
    (c) co-polymerizing the solution in-situ while it is exposed to an oxygen-containing atmosphere so as to establish on said film barrier a gelled insulator which reduces conductive heat loss from the heat storage liquid to an ambient medium above said insulator;
    (d) wherein the solution is co-polymerized such that the gel contains a myriad of gas-filled bubbles.

3. A method for the in-situ formation of a gelled heat insulator that is transparent to and stable in the presence of solar radiation upon a water-impervious film, comprising the steps of:
    (a) depositing on a water-impervious film an aqueous solution of co-polymerizable monomers which, upon co-polymerization in aqueous solution, form said gel and of an inorganic salt, wherein the aqueous solution of co-polymerizable monomers comprises an acrylic monofunctional monomer and an acrylic bifunctional monomer; and
    (b) co-polymerizing the solution in-situ while it is exposed to an oxygen-containing atmosphere so as to establish on said film a gelled heat insulator.

4. A method for the in-situ formation of a gelled heat insulator that is transparent to and stable in the presence of solar radiation upon a water-impervious film, comprising the steps of:
    (a) depositing on a water-impervious film an aqueous solution of co-polymerizable monomers which, upon co-polymerization in aqueous solution, form said gel and of an inorganic salt;
    (b) co-polymerizing the solution in-situ while it is exposed to an oxygen-containing atmosphere so as to establish on said film a gelled heat insulator; and
    (c) wherein the solution is co-polymerized such that the gel contains a myriad of gas-filled bubbles.

5. The method of claim 1 wherein the monofunctional monomer is acrylamide and the bifunctional monomer is methylene-bisacrylamide.

6. The method of claim 5 wherein the solution contains at least about 1.5% by weight of acrylamide and at least about 1% methylene-bisacrylamide by weight of acrylamide.

7. The method of claim 6 wherein the solution contains at least about 2% by weight of acrylamide and about 3% methylene-bisacrylamide by weight of acrylamide.

8. The method of claim 2 wherein the bubbles contain $CO_2$.

9. The method of claim 2 wherein the bubbles contain $N_2$.

10. In a heat storage pond having a heat storage liquid that can be raised to a temperature greater than that of an ambient medium, and an insulating layer of gel covering the liquid for thermally insulating the latter against significant conductive heat loss to the ambient medium above the gel, the improvement being the composition of the gel which comprises a polymeric cross-linked network formed by co-polymerization of an acrylic monofunctional monomer and an acrylic bifunctional monomer in an aqueous solution.

11. The invention of claim 10 wherein a redox-initiating system of catylyst and activator are used.

12. The invention of claim 10 wherein the monofunctional monomer is acrylamide.

13. The invention of claim 10 wherein the monofunctional monomer is acrylamide and the bifunctional monomer is methylene-bisacrylamide.

14. The invention of claim 10 wherein the monofunctional monomer is acrylamide and the bifunctional monomer is 1,2-ethylene-bisacrylamide.

15. The invention of claim 11 wherein the catylyst is ammonium persulfate and the activator is tetramethyl ethylene diamine.

16. The invention of claim 10 wherein the gel comprises constituents A, B, C and D in the following proportions:

A is greater than or equal to 1.5 percent of the gel by weight;
B is in the range 1% to 10% of A;
C is in the range 0 to 0.06 cc per liter of gel; and
D is in the range 1 to 700 mg per liter of gel.
where constituent A is an acrylic monofunctional monomer, constituent B is an acrylic bifunctional monomer, constituent C is tetramethyl-ethylene-diamine and constituent D is ammonium persulfate.

17. The invention of claim 16 wherein constituent A is acrylamide, and constituent B is methylene-bisacrylamide.

18. The invention of claim 16 wherein constituent A is acrylamide, and constituent B is 1,2-ethylene-bisacrylamide.

19. The invention of claim 10 wherein the aqueous solution contains a dissolved inorganic salt.

20. The invention of claim 19 wherein the salt is $MgCl_2.6H_2O$.

21. The invention of claim 19 wherein the salt is Carnalite.

22. The invention of claim 19 wherein the salt is a member of the group comprising magnesium chloride, sodium chloride, potassium chloride, calcium chloride, or mixtures thereof.

23. The invention of claim 20 wherein the salt is in the range 5% to 20%.

24. The invention of claim 20 wherein the salt is in the range 5% to the saturation point.

25. The invention of claim 19 wherein the aqueous solution is sea water.

26. The invention of claim 10 including constituents that produce a gas when the constituents are mixed together.

27. The invention of claim 26 wherein the gas is carbon dioxide.

28. The invention of claim 27 wherein the constituents producing are sodium-bicarbonate and hydrochloric acid.

29. The invention of claim 28 wherein a saturated solution of sodium bicarbonate is in the range 100 cc to 700 cc per liter of gel, and a 32% solution of hydrochloric acid is in the range 10 cc to 100 cc per liter of gel.

30. The invention of claim 26 wherein the gas is trapped in the gel during its formation producing a plurality of bubbles.

31. A method for preparing the gel of claim 10 under field conditions wherein the constituents are dissolved to produce a solution that is deposited on top of a film impervious to water and transparent to solar radiation.

32. The invention of claim 31 wherein polymerization takes place in sunlight under ambient conditions.

33. The invention of claim 31 wherein the aqueous solution contains a dissolved inorganic salt and polymerization takes place under ambient conditions of temperature in the range 10°–40° C.

34. The invention of claim 31 wherein the film is in the form of encapsulated air bubbles.

35. In a heat storage pond having a heat storage liquid that can be raised to a temperature greater than that of an ambient medium, and an insulating layer of gel that covers the liquid and is thick enough to thermally insulate the liquid against significant conductive heat loss to the ambient medium above the gel, the improvement comprising the presence in the gel of bubbles of such size and distribution as to increase the heat insulating quality of the gel.

36. The invention of claim 35 wherein the bubbles are formed by gas generated during formation of the gel.

37. The invention of claim 35 wherein the gel is cast around hollow elements that define the bubbles.

* * * * *